Patented Mar. 16, 1954

2,672,486

UNITED STATES PATENT OFFICE 2,672,486

PRODUCTION OF INSECTICIDAL
COMPOSITION OF MATTER

Morton Kleiman and Arthur Goldman, Chicago, Ill., assignors to Arvey Corporation, a corporation of Illinois No Drawing. Application June 3, 1948
Serial No. 30,987

1 Claim. (Cl. 260—648)

This invention relates to the production of an insecticidal composition of matter.

More specifically, this invention relates to a novel method for preparing 1,4,5,6,7,8,8-heptachloro - 3a,4,7,7a - tetrahydro - 4,7 - methanoindene using as a starting material the adduct of hexachlorocyclopentadiene and cyclopentadiene.

The adduct of hexachlorocyclopentadiene and cyclopentadiene can be prepared simply by intermixing said hexachlorocyclopentadiene and said cyclopentadiene preferably in the absence of additional solvent. The reaction proceeds in a satisfactory manner at room temperature and also may be accomplished at cooler or more elevated temperatures. The reaction is somewhat exothermic and the temperatures thereof should be controlled such that temperatures not exceeding about 200° C. and preferably not exceeding about 100-120° C. are maintained throughout the course of the reaction. The reactants may be utilized in a molar ratio of 1:1; however, an excess of either reactant can be present. The reaction product, namely the adduct of hexachlorocyclopentadiene and cyclopentadiene, is crystalline in nature and may be purified by recrystallization from a solvent such as methanol.

Thus, as a specific method for preparing the aforementioned adduct, hexachlorocyclopentadiene may be placed in a vessel equipped with a mechanical stirrer, thermometer and reflux condenser. The hexachlorocyclopentadiene may then be heated to about 70° C. and have added thereto in a portionwise manner an equal molar quantity of cyclopentadiene. The reaction temperature may be maintained at about 70-85° C. After the cyclopentadiene has been completely added, the stirring may be continued for several hours. The crystalline material thus formed may be purified by recrystallization one or more times from methanol.

The reaction of hexachlorocyclopentadiene and cyclopentadiene may be symbolized as follows:

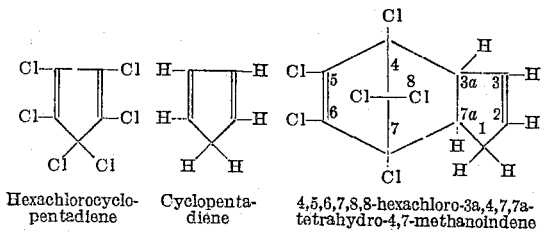

Hexachlorocyclopentadiene   Cyclopentadiene   4,5,6,7,8,8-hexachloro-3a,4,7,7a-tetrahydro-4,7-methanoindene According to "The Ring Index" by Patterson and Capell, A. C. S. Monograph Series, No. 84, 1940, dicyclopentadiene, $C_{10}H_{12}$ is described as 4,7-methano-3a,4,7,7a - tetrahydroindene. Following this accepted system of nomenclature, the adduct of hexachlorocyclopentadiene and cyclopentadiene would be described as 4,5,6,7,8,8-hexachloro-3a,4,7,7a - tetrahydro - 4,7-methanoindene. Hereinafter, for the purpose of brevity, this compound, which is the starting material utilized in the process herein disclosed, will be referred to as chlordene.

The product of the process presently disclosed, as named in the second paragraph of this specification, has the following structure:

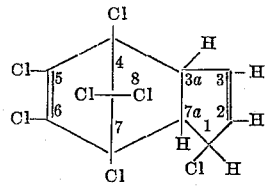

1,4,5,6,7,8,8-heptachloro-3a,4,7,7a-tetrahydro-4,7-methanoindene and for the purpose of brevity and convenience, said product will hereinafter be referred to as 1-chloro-chlordene.

In accordance with the present invention, 1-chloro-chlordene may be formed by oxidizing chlordene with selenium dioxide ($SeO_2$) in the presence of an organic acid, and treating the thus formed ester of chlordene and the acid utilized with hydrogen chloride in the presence of a catalyst and a small amount of water to result in the formation of the desired 1-chloro-chlordene.

The process herein disclosed has many advantages which will become more apparent by reading the following disclosure. Thus, the present invention provides a means to introduce a single chlorine atom into an olefinic molecule at a position known and definite, to result in a highly desirable and valuable material. In accomplishing this purpose, extreme reaction conditions are completely avoided, thereby minimizing or substantially completely avoiding side reactions which might result in undesirable side products. As a result, overall yields as high as 90% or even higher, based upon the theoretical amount possible, may be obtained. Thus, for every mole of chlordene used as starting material, 0.9 or more moles of 1-chloro-chlordene may be recovered from the process.

The process of the present invention is of such a nature that the reagents utilized, such as the spent selenium dioxide, and the solvents, etc., may be recovered and re-used in the process either directly or with a minimum amount of treatment. Further, said process is easily adapted to commercial production. All the advantages of this process as herein expressed or as evident from the nature thereof combine to very favorably affect the economies of the present invention.

To facilitate an understanding of the nature of the process, the reaction herein involved is graphically illustrated as follows:

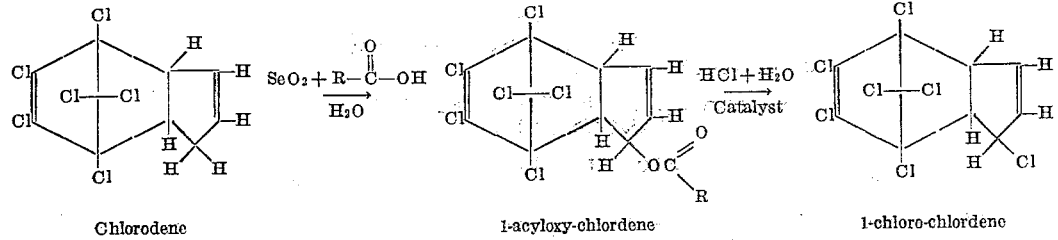

Chlorodene           1-acyloxy-chlordene           1-chloro-chlordene

The nature of "R" as above utilized as an organic radical will be more fully explained hereinafter.

The oxidation reaction herein involved is based on the fact that selenium dioxide in the presence of an organic acid and a small amount of water will react with chlordene to form 1-acyloxy-chlordene and metallic selenium. This may be accomplished, for example, by adding sufficient water to the selenium dioxide such that a solution thereof is obtained. To the thus obtained solution may be added chlordene and a carboxylic acid of relatively low molecular weight and relatively inert to the oxidizing effect of selenium dioxide, such as acetic, propionic, butyric, or benzoic acid. The temperature of reaction should be somewhat above room temperature and will be naturally limited by the decomposition temperature of the reactants or product. Generally, temperatures between about 60 and about 185° C. are applicable, and temperatures between about 100 and 160° C. are more preferred. More specifically, the application of temperatures between about 120° and 130° C. provide a satisfactory rate of reaction to result in excellent yields of desired oxidized material in relatively short periods of time. It is thus convenient to utilize an acid boiling within the above mentioned preferred range, such as acetic acid, thereby allowing the reaction to proceed at the reflux temperature of the mixture, and obviating the necessity for close temperature control.

The ratio of reactants, the method by which they may be intermixed, the operation during reaction, and the time required are not critical and may be varied quite considerably.

The reactants in the oxidation stage comprise chlordene, water, selenium dioxide and an acid as above described. It is preferred that the water be added to the selenium dioxide and that the chlordene and acid be then added to the selenium dioxide-water mixture either together or individually in any order; however, the order and method of combining the reactants is not critical, and it is only necessary that they are intermixed.

The amount of water utilized is not critical; however, it is preferred to maintain the concentration of water at a minimum. Thus, although as much water as is needed to dissolve the selenium dioxide can be utilized, an excess thereof, or a smaller amount thereof will be satisfactory. Since water is formed during the reaction to the extent of one mole of water per mole of chlordene oxidized and esterified, it is evident that only sufficient water must be added to initiate the reaction. As a matter of fact, there may be sufficient water concomitant with the other reactants to obviate the necessity for adding an additional amount. It is thus evident that only a very small amount of water is necessary to initiate the reaction. A large excess of water, while permissible, is not desirable.

Two moles of chlordene are oxidized per mole of selenium dioxide reduced, and consequently this stoichiometric ratio of reactants is preferred but not critical. Thus, if less than the stoichiometric amount of selenium dioxide be utilized, then some of the chlordene will remain unchanged when the reaction is completed. Conversely, if less than the stoichiometric amount of chlordene be utilized, then excess selenium dioxide will remain in the reaction mixture after completion of said reaction. Since the selenium dioxide is water soluble and since chlordene is not, it is convenient to use a ratio of reactants which will result in the substantially complete conversion of chlordene to the oxidized product thereof, thereby obviating the necessity for separating any unreacted chlordene from the finished 1-chloro-chlordene. Therefore, a stoichiometric amount, or perhaps a slight excess thereof is preferred. Too large an excess of selenium dioxide should be avoided, mainly because that which does not react is subsequently removed with a water wash and is only more difficultly recoverable; all as more fully explained hereinafter.

The amount and type of organic acid utilized will next be considered. The organic acid used is both a reactant and a solvent for the reaction mixture. Thus, a preferred amount of acid is that which will just dissolve the reaction mixture. An excess of acid is not harmful and will only tend to affect the rate of reaction because of the dilution effect; conversely, smaller amounts than the minimum amount necessary to dissolve the reactants completely may also be used to result in the desired product. It is therefore evident that the amount of acid used is not critical.

As previously stated, the organic acid should be of relatively low molecular weight and relatively inert to the oxidizing effect of selenium dioxide. It is convenient and preferred that said acid should be relatively soluble in water such that it can be removed from the reaction product merely by extraction with water. Further, the acid utilized should preferably be a liquid at the reaction temperature and be capable of dissolving the various reactants substantially completely without requiring the utilization of undue quantities of said acid. It is evident, therefore, that the common, available acids such as acetic, propionic and butyric acids are preferred; however, various other acids can be used, though perhaps with less convenience, and the nature of these acids will naturally suggest themselves to one skilled in the art and having knowledge of the present disclosure.

"The reaction mixture with which we are presently concerned does not require the use of a solvent other than the organic acid as hereinbefore related; however, the use of additional solvents in effectuating the reaction may at times be beneficial although generally is not preferred. The reaction may be carried out in the presence of such solvents as carbon tetrachloride, chloroform, benzene, toluene, hexane, pentane, dioxane, and the like. If an additional solvent be used, it is preferred that it be water soluble such that it can be separated from the reaction product by an aqueous extraction process. The use of additional solvent such as those suggested above may be advantageous in some instances, for example, if it is desired to minimize the amount of acid used, or if the acid has insufficient solvency power, or possibly if the acid is not a sufficiently mobile liquid at the temperature of reaction.

The rate of reaction is dependent upon those factors which generally affect chemical reactions. Therefore, varying the temperature of reaction and the concentration of reactants may affect the rate thereof. Generally, the reaction is completed after about 20 hours or perhaps less, depending upon the specific conditions utilized. Some product will have formed after only a very short period of reaction. Thus, at a reaction temperature of about 120–130° C., deposition of metallic selenium will have occurred after only about 10–15 minutes, thus indicating the formation of some 1-acyloxy-chlordene within that period. The use of excess reaction time is not deleterious to the product, and hence, close control in this respect is not critical. The rate of reaction and extent of reaction can be fairly closely estimated by the rate of deposition of metallic selenium and by the quantity thereof deposited. If, for example, the reaction proceeds for a period of time between about one-half to twenty hours, the metallic selenium formed during the reaction can be removed from the mixture by filtration or any other means and the weight thereof can then be determined. If such a determination indicates that the reaction, although having proceeded, is incomplete, then additional reaction time can be allowed for the remaining mixture. It is expressly understood that the present invention is not dependent upon, nor limited to, the reaction proceeding to completion, or even substantial completion. It is preferred, however, that such be the case inasmuch as it results in a more economical operation.

Where the oxidation reaction of chlordene as hereinbefore described is completed or has otherwise been stopped, the mixture contains, among other materials, the ester of chlordene and the organic acid utilized, previously symbolized as 1-acyloxy-chlordene. Further, the reaction mixture contains as a precipitate metallic selenium which can easily be removed by filtration, centrifuging, decanting of supernatant liquid, or by any other means known to the art. It is preferred that the metallic selenium be removed at this point, and, as a material economical aid, it can be reconverted to selenium dioxide by means well known to the art and subsequently re-utilized in the process as hereinbefore described.

The ester formed according to the present process need not be isolated preparatory to converting it to the desired 1-chloro-chlordene as hereinafter described, nor is it essential that any other material contained in the reaction mixture be removed prior to said conversion as more fully explained hereinafter.

The preparation of 1-chloro-chlordene from 1-acyloxy-chlordene is based on the fact that said acyloxy group can be replaced with a chlorine atom by treatment with hydrogen chloride in the presence of a Friedel-Crafts type catalyst and small amounts of water.

Therefore, to prepare the desired 1-chloro-chlordene, it is only necessary to add a Friedel-Crafts type catalyst to the reaction mixture as previously described and from which the metallic selenium is preferably removed, and then to introduce hydrogen chloride gas, preferably at such a rate that the mixture is substantially saturated therewith during the course of the reaction.

Friedel-Crafts type catalysts such as aluminum chloride ($AlCl_3$), ferric chloride ($FeCl_3$), antimony pentachloride ($SbCl_5$), boron trifluoride ($BF_3$), zinc chloride ($ZnCl_2$), titanium tetrachloride ($TiCl_4$), hydrogen fluoride ($HF$), sulfuric acid ($H_2SO_4$), phosphoric acid ($H_3PO_4$), phosphorous pentoxide ($P_2O_5$), stannic chloride ($SnCl_4$), boron trichloride ($BCl_3$), aluminum bromide ($AlBr_3$), and like materials may be utilized.

The reaction whereby 1-acyloxy-chlordene is converted to 1-chloro-chlordene is generally carried out at temperatures between about room temperature and about 185° C.; however, temperatures between about 60 and 160° C. are preferred. More specifically, the application of temperatures between about 120 and 130° C. provides a satisfactory rate of reaction to result in excellent yields of the desired, valuable product.

A preferred method of procedure is to saturate the reaction mixture with hydrogen chloride while said mixture is at room temperature, to then add the catalyst, and subsequently to bring the reaction mixture to the desired temperature while passing hydrogen chloride through the mixture at such a rate as to maintain a substantially saturated solution thereof during the course of the metathetical reaction.

The procedure is not limited to this preferred method however. Thus, the relative times at which the catalyst and hydrogen chloride are introduced are not critical, nor is it essential that the hydrogen chloride be first introduced at room temperature. The rate of introduction and passage through the reaction mixture of hydrogen chloride is not critical. If the rate of introduction be slow, then the reaction will be correspondingly of a slower rate. If the rate of introduction be increased then the rate of reaction will be increased. Any excess hydrogen chloride introduced may be vented from the reaction vessel, however, from an economical viewpoint it is desirable that any excess be kept at a minimum.

As in the oxidation step, previously described, it is convenient to carry out the metathetical reaction presently described at the reflux temperature of the reaction mixture. Therefore, if an acid such as acetic acid were the solvent originally used, allowing the reaction to proceed at the reflux temperature, which is within the preferred range of operation, obviates the necessity for close temperature control.

In the step of converting the chlordene ester to 1-chloro-chlordene, as well as in the prior oxidation stage, it is desirable that the reaction mixture be stirred, and that any other means commonly used to facilitate chemical reactions be used. Thus, the advantage of introducing hydrogen chloride into the reaction mixture in a manner such that it is dispersed throughout the mixture is apparent.

The rate of reaction wherein the replacement of the acyloxy group with a chlorine atom is effected is relatively rapid, and generally the desired product will form between about 15 minutes and about 10 hours. It is, of course, obvious that the rate of reaction is dependent on those usual factors such as temperature, concentration of reactants, efficiency of stirring and the like. Thus, in the lower temperature range, the reaction is slower than at more elevated temperatures, and the rate of reaction is also slower if the concentration of reactants be diminished. It has been found that a reaction time of about 4 to 6 hours at a temperature of about 120–130° C. will result in a practically quantitative yield of 1-chloro-chlordene where the level of hydrogen chloride was maintained at or near the saturation point of the reaction mixture. Excess time of reaction is not deleterious and consequently the reaction need not necessarily be stopped at or near completion. Further, the reaction may be abated before conversion is complete. However, since the reaction time for achieving complete conversion is not excessive, it is economical and preferred that sufficient time be allowed to substantially completely convert all of the 1-acyloxy-chlordene to 1-chloro-chlordene.

As a non-fully equivalent alternative, the hydrogen chloride in the reaction previously described may be introduced in the form of its aqueous solution such as concentrated hydrochloric acid or fuming hydrochloric acid. The amount of hydrochloric acid used will depend on the amount of chlordene ester which is to be converted, and a stoichiometric excess of hydrochloric acid is preferred. Said acid is preferably added portionwise during the course of the reaction, such that a sufficient amount of HCl is constantly present in the reaction mixture to maintain said reaction at a reasonable rate.

The 1-chloro-chlordene prepared according to the present process may be recovered from the final reaction mixture in a relatively easy manner. Generally, the reaction mixture will contain 1-chloro-chlordene, which is not water soluble, and various other materials such as a low molecular weight acid, possibly some selenium dioxide, some hydrogen chloride and various other water soluble materials. Hence, it is merely necessary to add water to the reaction mixture precipitate the desired 1-chloro-chlordene which can then be filtered to result in the solid, isolated, desired product which may not require further purification.

Alternatively, both water and an organic solvent not miscible therewith, such as carbon tetrachloride, benzene, heptane, chloroform, isopropyl ether, ethyl acetate, and the like, may be added to the reaction mixture. The water-soluble material will be contained in the water layer and the 1-chloro-chlordene in the organic layer. The two layers can then be separated, and the organic solvent can then be removed from the desired product by evaporation, distillation, or the like.

If the organic acid of a relatively low molecular weight utilized in the oxidation reaction be insufficiently soluble in water to be effectively extracted therewith, then it may be advantageous to distill either at atmospheric or in vacuo all or a portion of the acid contained in the mixture. Alternatively, the acid may be allowed to remain in the reaction mixture and to separate out upon the addition of water. The entire mixture may then be filtered to recover whatever 1-chloro-chlordene may have precipitated, and then the acid layer may be distilled to recover the 1-chloro-chlordene remaining dissolved therein. Extraction with dilute aqueous alkali will also effectively remove any acid which is only difficultly soluble in water.

Ordinarily, the 1-chloro-chlordene recovered as herein described is pure enough to be utilized without further treatment. Probable impurities contained therein may be unreacted chlordene or unconverted chlordene ester. The presence of other impurities is unlikely because of the nature of the process and the nature of extraction of the product. If desired, the product may be purified by distillation in vacuo, recrystallization, sublimation, treatment with porous materials such as silica gel, fuller's earth or like materials, or by any other means known to the art.

The following example is for the purpose of illustrating the present invention, without, however, restricting it thereto.

*Example*

To a reaction vessel equipped with a stirrer and reflux condenser was added 19 parts (by weight) selenium dioxide and 5 parts (by weight) water. The mixture was heated to dissolve the selenium dioxide and 157 parts (by weight) acetic acid was added to the selenium dioxide-water mixture. Then 102 parts (by weight) chlordene was added to the reaction vessel. The mixture thus obtained was heated to reflux temperature and so maintained for a period of 22 hours. At that time the mixture was filtered to remove the precipitated metallic selenium, and then placed in a similar reaction vessel as previously described and further equipped with a gas inlet tube extending to the bottom thereof and having attached thereto a sintered glass dispersion piece. Dry hydrogen chloride gas was passed through the reaction mixture, and while being stirred, the mixture was heated to reflux temperature. Zinc chloride (37 parts by weight) was then added to the mixture, and the flow of hydrogen chloride was continued at such a rate as to maintain a saturated solution thereof at the reflux temperature. After 6 hours the flow of hydrogen chloride was discontinued and the mixture was allowed to cool to room temperature. Sufficient water and isopropyl ether were then added to substantially completely dissolve all of the reaction mixture. The two layers were separated and the ether layer was extracted once with water and then twice with 5% aqueous sodium hydroxide and then once again with water. The thus extracted ether solution was dried with calcium chloride, treated with Nuchar, filtered and concentrated by evaporation almost to dryness. The residue was then dissolved in pentane and crystallized therefrom. 1-chloro-chlordene, fairly pure, and only slightly discolored, was obtained in the amount of 86.6 parts (by weight) in the first crop of crystals. A second crop of crystals amounted to 9.7 parts of 1-chloro-chlordene, thereby yielding a total of 95.3 parts by weight or about an 85% yield based on the original amount of chlordene utilized.

The product at this stage was of a sufficient purity for utilization without further treatment; however, to remove the slight discoloration the product was dissolved in pentane and passed through a column packed with 67 parts (by weight) of Florex. The column was then eluted with more pentane, and the pentane fractions were then combined and evaported to dryness to result in pure, white, crystalline 1-chloro-chlordene. The amount of product recovered from the Florex column was almost equal to that introduced, thereby indicating the purity of the material prior to Florex treatment.

It is thus seen that the process herein disclosed has many advantages. No complex equipment is necessary; no intermediate products need be isolated or otherwise purified; the absence of undesirable side reactions insures excellent yields of product; extreme reaction conditions are avoided; and the final product is easily isolated in a relatively pure state.

The product obtained from the process of the present invention exhibits a very high order of toxicity toward a large variety of insects and similar forms of life, and its value is further enhanced by the fact that it exhibits "residual toxicity"—that is, a retention of insecticidal potency for a considerable length of time after being deposited on exposed solid surfaces. This latter property considerably increases the value of an insecticidally active compound for many types of applications.

1-chloro-chlordene may be utilized in the form of oil sprays, dusts, aqueous emulsions, aerosols, etc., either alone or in association with any other desired toxicants or carriers, in preparations and by methods of application known to the art.

We claim as our invention:

The method which comprises reacting 4,5,6,7,8,8-hexachloro-3a,4,7,7a-tetrahydro-4,7-methanoindene in the presence of water with selenium dioxide and acetic acid, said acid being present in an amount adequate to substantially completely dissolve the reactants, at the reflux temperature of said reaction mixture to form the 1-acyloxy derivative thereof, separating precipitated metallic selenium, reacting said derivative while retaining it in the remaining resulting reaction mixture with hydrogen chloride in the presence of zinc chloride at the reflux temperature of the latter reaction mixture to convert said derivative to 1,4,5,6,7,8,8 - heptachloro-3a,4,7,7a-tetrahydro - 4,7 - methanoindene, and separating and recovering the latter as the product of the process.

MORTON KLEIMAN.
ARTHUR GOLDMAN.

References Cited in the file of this patent

UNITED STATES PATENTS

| Number | Name | Date |
| --- | --- | --- |
| 2,395,452 | Bruson | Feb. 26, 1946 |
| 2,418,708 | Gwynn et al. | Apr. 8, 1947 |
| 2,481,159 | Schmerling | Sept. 6, 1949 |
| 2,519,190 | Hyman | Aug. 15, 1950 |
| 2,528,655 | Herzfeld et al. | Nov. 7, 1950 |
| 2,576,666 | Bluestone et al. | Nov. 27, 1951 |

FOREIGN PATENTS

| Number | Country | Date |
| --- | --- | --- |
| 686,849 | Germany | Jan. 17, 1940 |

OTHER REFERENCES

Stein: "Angewandte Chemie," vol. 54, pp. 146-152 (1941).